United States Patent
Zhang et al.

(10) Patent No.: US 9,710,513 B2
(45) Date of Patent: Jul. 18, 2017

(54) ACCESS MANAGEMENT METHOD, DEVICE AND SYSTEM

(75) Inventors: Chaofeng Zhang, Shenzhen (CN); Xiaojiu Tong, Shenzhen (CN); Wei Chen, Shenzhen (CN); Junbao Zhong, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 328 days.

(21) Appl. No.: 14/238,904

(22) PCT Filed: May 18, 2012

(86) PCT No.: PCT/CN2012/075699
§ 371 (c)(1),
(2), (4) Date: Feb. 14, 2014

(87) PCT Pub. No.: WO2013/023469
PCT Pub. Date: Feb. 21, 2013

(65) Prior Publication Data
US 2014/0207809 A1    Jul. 24, 2014

(30) Foreign Application Priority Data

Aug. 16, 2011 (CN) .......................... 2011 1 0234126

(51) Int. Cl.
*G06F 17/30* (2006.01)
*H04W 64/00* (2009.01)
(Continued)

(52) U.S. Cl.
CPC .. *G06F 17/30424* (2013.01); *G06F 17/30345* (2013.01); *G06F 17/30914* (2013.01);
(Continued)

(58) Field of Classification Search
CPC ........ G06F 17/30424; G06F 17/30914; H04W 64/00
See application file for complete search history.

(56) References Cited

U.S. PATENT DOCUMENTS 7,768,995 B2 * 8/2010 Yang .................... H04L 45/021
370/351
2003/0093555 A1 * 5/2003 Harding-Jones ...... H04L 49/254
709/238

(Continued)

FOREIGN PATENT DOCUMENTS

| CN | 101366227 A | 2/2009 |
|----|-------------|--------|
| CN | 101841877 A | 9/2010 |
| CN | 102045692 A | 5/2011 |

OTHER PUBLICATIONS

2009 First International Conference on Future Information Networks, "A Novel Mobility Management Mechanism Based on An Efficient Locator/ID Separation Scheme", Zhiwei Yan, etc.*
"LISP Mobile Node extension"; ZTE Corporation; Ningxia Zhao et al. Jul. 11, 2011, pp. 1-10. XP015077357.
"A novel mobility management mechanism based on efficient Locator/ID separation scheme" ; Beijing Jiaotong University; Zhiwei Yan et al. Oct. 14, 2009 pp. 11-16. XP031570381.

(Continued)

*Primary Examiner* — Marsha D. Banks Harold
*Assistant Examiner* — Anthony Luo
(74) *Attorney, Agent, or Firm* — Ling Wu; Stephen Yang; Ling and Yang Intellectual Property (57) ABSTRACT

An access management method, device and system are disclosed. It relates to the field of communication; and the problem that the existing update mechanism of an AID and RID mapping relationship table has a low reliability and influences the network working efficiency is solved. The method includes: when detecting that an MN accessing an ASR is offline, the ASR querying a local AID and Routing Identity RID mapping table, and determining a correspondent node of the offline MN; and the ASR sending a mapping table entry update message to an ILR and an ISR and an ASR where the correspondent node is located, and setting an RID (Continued)

in a mapping table entry corresponding to the MN to be NULL, which represents that the MN does not access the ASR currently.

12 Claims, 3 Drawing Sheets

(51) Int. Cl.
*H04W 80/04* (2009.01)
*H04L 29/12* (2006.01)

(52) U.S. Cl.
CPC ...... *G06F 17/30952* (2013.01); *H04W 64/00* (2013.01); *H04L 61/103* (2013.01); *H04L 61/2084* (2013.01); *H04W 80/04* (2013.01)

(56) References Cited

U.S. PATENT DOCUMENTS

| | | | |
|---|---|---|---|
| 2009/0022054 A1* | 1/2009 | Kim | H04W 28/10 370/235 |
| 2009/0034466 A1* | 2/2009 | Lindskog | H04L 1/0078 370/329 |
| 2010/0208617 A1 | 8/2010 | Dong et al. | |
| 2011/0243065 A1* | 10/2011 | Sarma | H04W 40/02 370/328 |

OTHER PUBLICATIONS

International Search Report for PCT/CN2012/075699 dated Jul. 27, 2012.

* cited by examiner

ACCESS MANAGEMENT METHOD, DEVICE AND SYSTEM

TECHNICAL FIELD

The present document relates to the field of communication, and particularly, to an access management method, device and system in an identification network.

BACKGROUND OF THE RELATED ART

An IP address in TCP/IP widely used in the Internet has dual functions, which not only serves as a location identifier of a host network interface of the communication terminal of a network layer in the network topology, but also serves as an identity of a host network interface of a transmission layer. The situation of host mobility is not considered at the beginning of the design of TCP/IP. However, when the host mobility is more and more popular, a defect of semantic overload of the IP address becomes increasingly apparent. When the IP address of the host is changed, not only the routing is changed, but also the identity of the host of the communication terminal is changed, thus, it will cause that the routing load becomes much heavier, and the change of host identifier will lead to the interruption of applications and connections. The purpose of raising the problem of separating identity and location is to solve problems such as the semantic overload of the IP address and the heavy routing load and so on, and the dual functions of the IP address are separated, which implements the support on problems such as mobility, multi-homing, IP address dynamic reallocation, routing load reduction and inter-access between different network areas in the next generation Internet and so on.

The identification network is one of schemes related to separating the identity and the location. In the technical system of the identification network, an Access Identity (AID) represents identity information of a Mobile Node (MN), a Routing Identity (RID) represents location information of the MN, the AID is fixedly allocated to a user, and the RID is decided by an Access Switching Router (ASR) where the user is located. The access switching router informs an ASR where all Correspondent Nodes (CN) of the MN are located, an Internet Interface Service Router (ISR) and an Information Logging Router (ILR), of an AID-RID mapping relationship of the MN.

In the related technical embodiments, when the MN powers off, the ASR sends a request message update_request for deleting a table entry <AID, RID> corresponding to the MN to the ILR and ISR, and the ILR and ISR delete this table entry according to the message update_request.

The above way of processing has the following problems:

It is assumed that an address of the MN is <AID1, RID1>, the MN powers off after starting a video stream session (i.e. a User Datagram Protocol (UDP) bearer Real-time Transport Protocol (RTP) message) between the MN and a certain video server of the Internet (or when the MN is in a power-off state, an Internet user maliciously sends a large number of messages to the address AID1 of the MN), the ASR sends a request for deleting the table entry <AID1, RID1> to the ISR, and the ISR deletes the table entry. The follow-up data messages of the video stream reach the ISR, the ISR does not find any mapping table entry, it sends the messages to each ASR and makes a query to the ILR in the meantime, and the ILR responds that no table entry is found. Before the video stream interrupts, a query needs to be made to the ILR every time a message of this stream is received, and the ILR responds that no table entry is found each time. If calculation is performed according to that traffic of the video stream is of 800 bps, a length of each video message is of 1048 Bytes, and the ISR receives 97 video messages every second, this will cause that an ISR control plane intensively sends 97 unnecessary query messages to the ILR every second, which occupies a large amount of resources of the ISR control plane, so that other functions will be influenced seriously. On the other hand, a forwarding plane also sends a large number of messages which should be discarded to each ASR, thus wasting the network bandwidths. In conclusion, the related update mechanism of an AID and RID mapping relationship table has a low reliability, which influences the network working efficiency.

SUMMARY OF THE INVENTION

The present document provides an access management method, device and system, which solves the problem that the existing update mechanism of an AID and RID mapping relationship table has a low reliability and influences the network working efficiency.

An access management method comprises:

when detecting that a Mobile Node (MN) accessing an Access Switching Router (ASR) is offline, the ASR querying a local Access Identity (AID) and Routing Identity (RID) mapping table, and determining a correspondent node of the offline MN; and the ASR sending a mapping table entry update message to an Information Logging Router (ILR) and an Internet Interface Service Router (ISR) and an ASR where the correspondent node is located, and setting an RID in a mapping table entry corresponding to the MN to be NULL, which represents that the MN does not access the ASR currently.

Preferably, the above access management method further comprises:

the MN reaccessing any ASR, the ASR registering a new mapping table entry to the ILR, and establishing a mapping relationship between an RID of the ASR and an AID of the MN.

The present document further provides an access management method, which comprises:

receiving a mapping table entry update message sent by an ASR, wherein, the mapping table entry update message indicates to set an RID in a mapping table entry corresponding to an MN to be NULL, which represents that the MN does not access the ASR currently;

updating the locally stored RID in the mapping table entry corresponding to the MN to be NULL; and when an RID corresponding to a destination AID of a locally received message is NULL, discarding the message.

Preferably, receiving a mapping table entry update message sent by an ASR is: an ISR and/or other ASRs except the ASR receiving the mapping table entry update message sent by the ASR.

Preferably, after a step of updating the locally stored RID corresponding to the AID corresponding to the MN to be NULL, the access management method further comprises:

setting an aging timer for the mapping table entry corresponding to the MN, and starting timing after updating the mapping table entry; and after the aging timer times out, locally deleting the mapping table entry.

Preferably, the above access management method further comprises:

when a mapping table entry corresponding to the destination AID of the received message is not found, sending a message for requesting the mapping table entry corresponding to the destination AID to an ILR; and receiving the mapping table entry corresponding to the destination AID of the message returned by the ILR.

Preferably, the above access management method further comprises:

when a mapping table entry corresponding to the destination AID of the received message is not found, sending a message for requesting the mapping table entry corresponding to the destination AID to an ILR; and when the ILR replies that the mapping table entry corresponding to the destination AID does not exist, generating a temporary mapping table entry of the destination AID, setting the RID corresponding to the destination AID to be NULL, and setting an aging timer for the temporary mapping table entry.

The present document further provides an access management method, which comprises:

an ILR receiving a mapping table entry update message sent by an ASR, wherein, the mapping table entry update message indicates to set an RID in a mapping table entry corresponding to an MN to be NULL, which represents that the MN does not access the ASR currently;

updating the locally stored RID in the mapping table entry corresponding to the MN to be NULL; and when a message for requesting the mapping table entry corresponding to the MN is received, sending a response message, and carrying the mapping table entry corresponding to the MN in the response message, wherein, the RID recorded in the mapping table entry is NULL.

Preferably, the above access management method further comprises:

the ILR receiving a mapping table entry update message sent by an ASR which the MN reaccesses, wherein, a mapping table entry recording a mapping relationship between an AID of the MN and an RID of the reaccessed ASR is included in the mapping table entry update message; and the ILR updating the mapping table entry corresponding to the MN to the mapping table entry in the mapping table entry update message, and informing an ISR and all the ASRs of a new mapping table entry corresponding to the MN.

The present document further provides an access management device, which comprises:

an information query module, configured to: when detecting that an MN accessing an ASR is offline, query a local AID and RID mapping table, and determine a correspondent node of the offline MN; and an update notification module, configured to: send a mapping table entry update message to an ILR and an ISR and an ASR where the correspondent node is located, and set an RID in a mapping table entry corresponding to the MN to be NULL, which represents that the MN does not access the ASR currently.

Preferably, the update notification module is further configured to: when the MN reaccesses any ASR, register a new mapping table entry to the ILR, and establish a mapping relationship between an RID of the ASR and an AID of the MN.

The present document further provides an access management device, which comprises:

a notification receiving module, configured to: receive a mapping table entry update message sent by an ASR, wherein, the mapping table entry update message indicates to set an RID in a mapping table entry corresponding to an MN to be NULL, which represents that the MN does not access the ASR currently;

a mapping update module, configured to: update the locally stored RID in the mapping table entry corresponding to the MN to be NULL; and a data management module, configured to: when an RID corresponding to a destination AID of a locally received message is NULL, discard the message.

Preferably, the above access management device further comprises:

an aging timer, configured to: start timing after the mapping update module updates the mapping table entry, and after timing out, indicate the mapping update module to locally delete the mapping table entry.

Preferably, the data management module is further configured to: when a mapping table entry corresponding to the destination AID of the received message is not found, send a message for requesting the mapping table entry corresponding to the destination AID to an ILR; and the mapping update module is further configured to: receive the mapping table entry corresponding to the destination AID of the message returned by the ILR.

Preferably, the data management module is further configured to: when a mapping table entry corresponding to the destination AID of the received message is not found, send a message for requesting the mapping table entry corresponding to the destination AID to an ILR; and the mapping update module is further configured to: when the ILR replies that the mapping table entry corresponding to the destination AID does not exist, generate a temporary mapping table entry of the destination AID, set the RID corresponding to the destination AID to be NULL, and set the aging timer for the temporary mapping table entry.

The present document further provides an access management device, which comprises:

a notification receiving module, configured to: receive a mapping table entry update message sent by an ASR, wherein, the mapping table entry update message indicates to set an RID in a mapping table entry corresponding to an MN to be NULL, which represents that the MN does not access the ASR currently;

a mapping update module, configured to: update the locally stored RID in the mapping table entry corresponding to the MN to be NULL; and a request response module, configured to: when a message for requesting the mapping table entry corresponding to the MN is received, send a response message, and carry the mapping table entry corresponding to the MN in the response message, wherein, the RID recorded in the mapping table entry is NULL.

Preferably, the notification receiving module is further configured to: receive a mapping table entry update message sent by an ASR which the MN reaccesses, wherein, a mapping table entry recording a mapping relationship between an AID of the MN and an RID of the reaccessed ASR is included in the mapping table entry update message; and the mapping update module is further configured to: update the mapping table entry corresponding to the MN to the mapping table entry in the mapping table entry update message, and inform an ISR and all the ASRs of a new mapping table entry corresponding to the MN.

The present document further provides an access management system, which comprises: a first access management device, a second access management device and a third access management device;

the first access management device is configured to: when detecting that an MN accessing the first access management device is offline, query a local AID and RID mapping table, determine a correspondent node of the offline MN, send a mapping table entry update message to the second access management device and the third access management device, and set an RID in a mapping table entry corresponding to the MN to be NULL, which represents that the MN does not access an ASR currently; and the second access management device is configured to: receive the mapping table entry update message sent by the first access management device, update the locally stored RID in the mapping table entry corresponding to the MN to be NULL, and when an RID corresponding to a destination AID of a locally received message is NULL, discard the message; and the third access management device is configured to: receive the mapping table entry update message sent by the first access management device, update the locally stored RID in the mapping table entry corresponding to the MN to be NULL, and when a message for requesting the mapping table entry corresponding to the MN is received, send a response message, and carry the mapping table entry corresponding to the MN in the response message, wherein, the RID recorded in the mapping table entry is NULL.

Preferably, the second access management device is further configured to: set an aging timer for the mapping table entry corresponding to the MN, and start timing after updating the mapping table entry, and after the aging timer times out, locally delete the mapping table entry.

Preferably, the second access management device is further configured to: when a mapping table entry corresponding to the destination AID of the received message is not found, send a message for requesting the mapping table entry corresponding to the destination AID to the third access management device, and receive the mapping table entry corresponding to the destination AID of the message returned by the third access management device, or, when the third access management device replies that the mapping table entry corresponding to the destination AID does not exist, generate a temporary mapping table entry of the destination AID, set the RID corresponding to the destination AID to be NULL, and set the aging timer for the temporary mapping table entry; and the third access management device is further configured to: when a message for requesting the mapping table entry corresponding to the MN is received, send a response message, and carry the mapping table entry corresponding to the MN in the response message, wherein, the RID recorded in the mapping table entry is NULL.

Preferably, the third access management device is further configured to: receive a mapping table entry update message sent by an ASR which the MN reaccesses, wherein, a mapping table entry recording a mapping relationship between an AID of the MN and an RID of the reaccessed ASR is included in the mapping table entry update message; update the mapping table entry corresponding to the MN to the mapping table entry in the mapping table entry update message, and inform the second access management device of a new mapping table entry corresponding to the MN.

The example of the present document provides an access management method, device and system, wherein, when detecting that an MN accessing an ASR is offline, the ASR queries a local AID and RID mapping table, and determines a correspondent node of the offline MN; and then the ASR sends a mapping table entry update message to an ILR and an ISR and an ASR where the correspondent node is located, and sets an RID in a mapping table entry corresponding to the MN to be NULL, which represents that the MN does not access the ASR currently; the ISR and ASR receive the mapping table entry update message sent by the ASR, wherein, the mapping table entry update message indicates to set the RID in the mapping table entry corresponding to the MN to be NULL, which represents that the MN does not access the ASR currently; the locally stored RID in the mapping table entry corresponding to the MN is updated to be NULL; and when an RID corresponding to a destination AID of a locally received message is NULL, the message is discarded, thus improving the accuracy of the updated mapping table entry, and solving the problem that the update mechanism of the AID and RID mapping relationship table has a low reliability and influences the network working efficiency.

PREFERRED EMBODIMENTS OF THE INVENTION

In the related embodiments, when an MN powers off, an ASR sends a request message update_request for deleting a table entry <AID, RID> corresponding to the MN to an ILR and ISR, and the ILR and ISR delete that table entry according to the message update_request.

The above processing way has the following problem:

It is assumed that an address of the MN is <AID1, RID1>, the MN powers off after starting a video stream session (i.e. a UDP bearer RTP message) between the MN and a certain video server of the Internet (or when the MN is in a power-off state, an Internet user maliciously sends a large number of messages to the address AID1 of the MN), the ASR sends a request for deleting the table entry <AID1, RID1> to the ISR, and the ISR deletes the table entry. The follow-up data messages of the video stream reach the ISR, the ISR does not find any mapping table entry, it sends the messages to each ASR and makes a query to the ILR in the meantime, and the ILR responds that no table entry is found. Before the video stream interrupts, a query needs to be made to the ILR every time a message of this stream is received, and the ILR responds that it is not found each time. If calculation is performed according to that a traffic of the video stream is of 800 bps, a length of each video message is of 1048 Bytes, and the ISR receives 97 video messages every second, this will cause that an ISR control plane intensively sends 97 unnecessary query messages to the ILR every second, which occupies a large amount of resources of the ISR control plane, so that other functions will be influenced seriously. On the other hand, a forwarding plane also sends a large number of messages, which should be discarded, to each ASR, thus wasting the network bandwidths. The other two situations also will cause the above problem.

In addition, a host on the Internet or on the identification network actively sends a large number of messages to an AID1 of a mobile station which has powered off or has been cancelled by the operator, this also will cause that the ISR or ASR sends a large amount of query messages to the ILR, which leads to overloading of a control plane of the ISR or ASR, thus normal functions are invalid.

In order to solve the above problem, the example of the present document provides an access management method, device and system. The examples of the present document will be described in detail in combination with the accompanying drawings below. It should be noted that the examples in the present document and the characteristics in the examples can be optionally combined with each other in the condition of no conflict.

The example 1 of the present document is firstly described in combination with the accompanying drawings.

Figure 1:
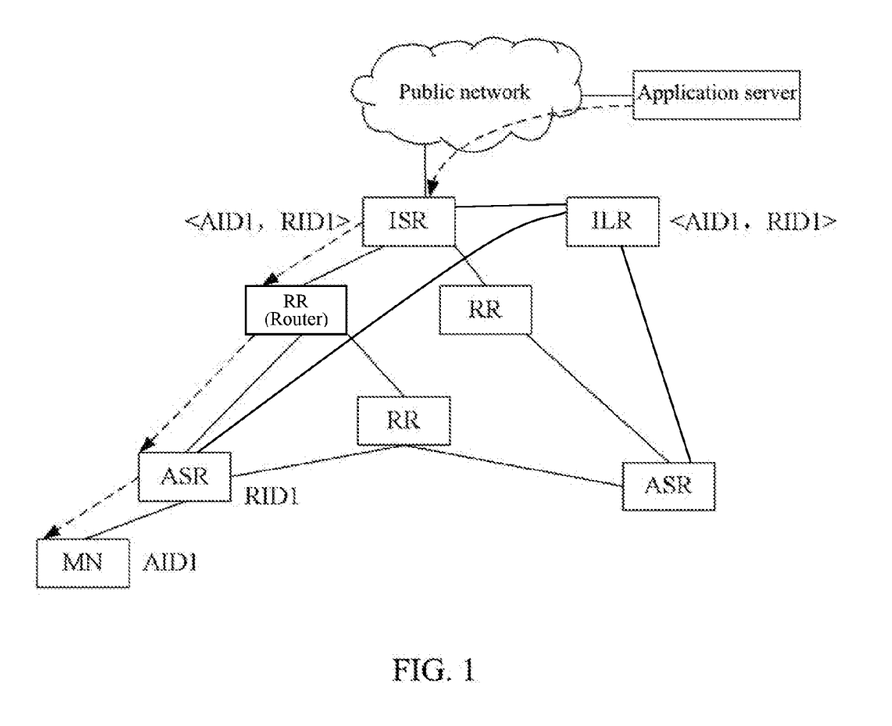
FIG. 1 is a schematic diagram of an application environment according to the example of the present document.

The application environment of the example of the present document is as shown in FIG. 1. Wherein, the ASR is responsible for access management and mobility management of the MN, and the RID is set on the ASR; the ISR is responsible for connecting the identification network and the Internet, and it also has the RID; and the ILR is responsible for saving location information of the MN (i.e. the <AID, RID> mapping relationship) and replying to the query for the mapping relationship. The AID of the MN is the AID1, and the MN performs accessing via the ASR1.

Figure 2:
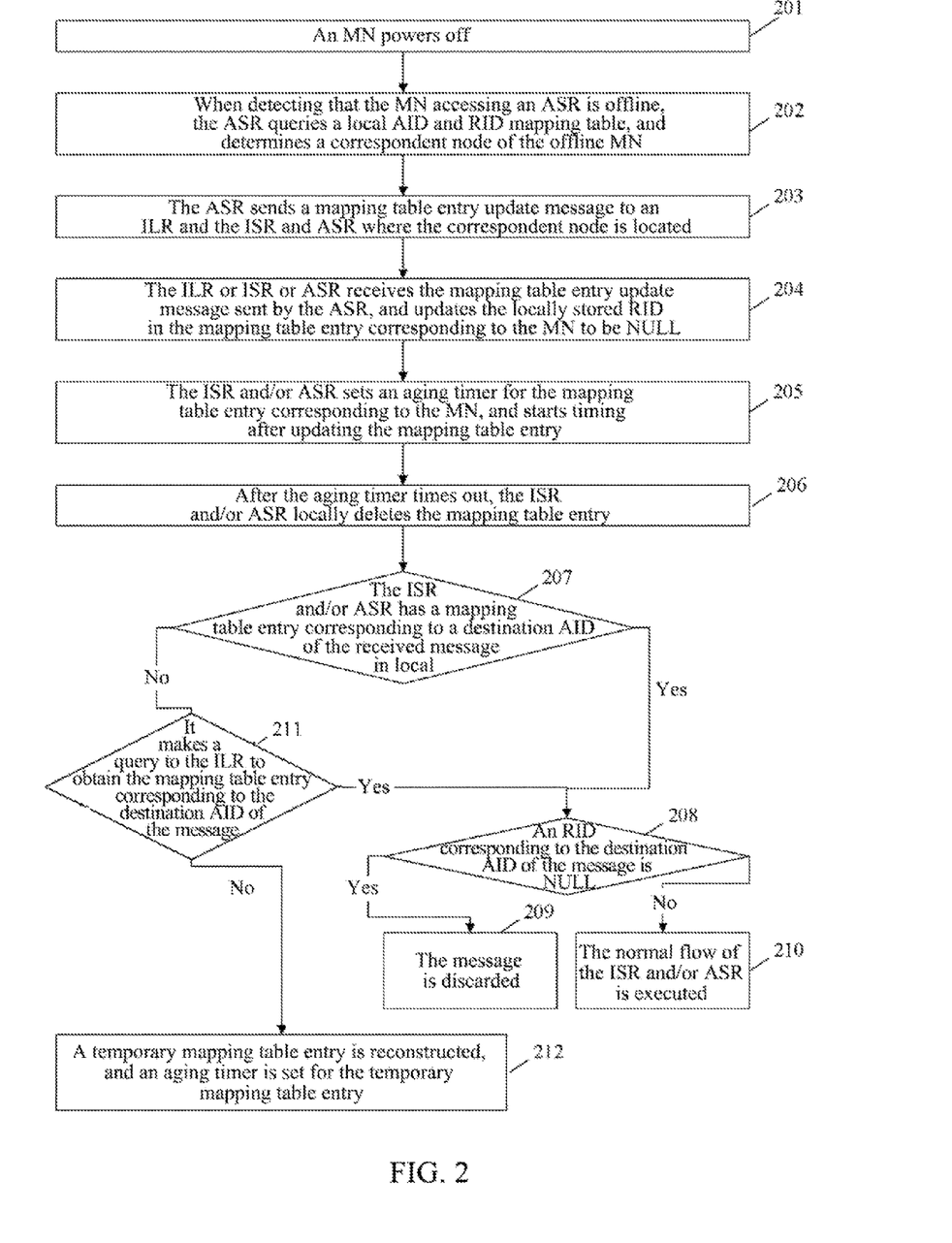
FIG. 2 is a flow diagram of an access management method provided by the example 1 of the present document.

In the network environment shown in FIG. 1, the flow of using the access management method provided by the example of the present document to manage a power failure of the MN is as shown in FIG. 2, and the following steps are included.

In step 201, an MN powers off (an identity of the MN is the AID1, and location information of the MN is the RID1).

In step 202, when detecting that the MN accessing an ASR is offline, the ASR queries a local AID and RID mapping table, and determines a correspondent node of the offline MN.

In the step, an ASR1 which is responsible for managing accessing of the MN discovers that the MN is offline, and finds an ISR and ASR where the Correspondent Node (CN) of the MN is located in the local AID and RID mapping table.

In step 203, the ASR sends a mapping table entry update message to an ILR and the ISR and ASR where the correspondent node is located.

In the step, the ASR1 sends the mapping table entry update message to the ILR and the ISR and ASR where the correspondent node queried out is located, and sets an RID in a mapping table entry corresponding to the MN to be NULL, which represents that the MN does not access the ASR currently, wherein, the <AID1, NULL> is a mapping table entry after resetting.

In step 204, the ILR or ISR or ASR receives the mapping table entry update message sent by the ASR, and updates the locally stored RID in the mapping table entry corresponding to the MN to be NULL.

In the step, the ILR or ISR or ASR receives the mapping table entry update message including the mapping table entry <AID1, NULL> sent by the ASR1, updates the mapping table entry corresponding to the locally stored AID1 according to the message, and updates the locally stored RID in the mapping table entry corresponding to the MN to be NULL. After the updating is completed, the ILR or ISR or ASR replies with an update response message to the ASR1.

In step 205, the ISR and/or ASR sets an aging timer for the mapping table entry corresponding to the MN, and starts timing after updating the mapping table entry.

In the step, the ISR and/or ASR sets an aging timer for the special mapping table entry <AID1, NULL>, and a duration for the timer can be set by the Operation Administration and Maintenance (OAM) and network management.

In step 206, after the aging timer times out, the ISR and/or ASR locally deletes the mapping table entry.

In the step, when the aging timer of the table entry <AID1, NULL> set in the step 205 is triggered, the table entry is deleted.

In step 207, the ISR and/or ASR receives a message, and locally queries whether a mapping table entry corresponding to a destination AID of the message exists.

In the step, the ISR and/or ASR receives a message of which the destination AID is the AID1, and locally queries whether a mapping table entry corresponding to the AID1 exists.

If the mapping table entry exists, it is to proceed to step 208; and if the mapping table entry does not exist, it is to proceed to step 211.

In step 208, the ISR and/or ASR judges whether an RID corresponding to the destination AID of the received message is NULL.

When a judgment result is yes, it is to turn to step 209; and when the judgment result is no, it is to turn to step 210.

In step 209, when the RID corresponding to the destination AID of the locally received message is NULL, the ISR and/or ASR discards the message.

In the step, when the ISR and/or ASR receives the message of which the destination AID is the AID1, if the mapping table entry <AID1, NULL> exists, it represents that the MN corresponding to the AID1 is still offline, the message is directly discarded, and the aging timer of the table entry is not reset, and the flow of processing the received message ends.

In step 210, when the RID corresponding to the destination AID of the message locally received by the ISR and/or ASR is not NULL, the normal flow of the ISR and/or ASR is executed.

In the step, if the AID1 corresponds to a normal RID, it indicates that the MN has normally accessed, the message can be forwarded according to the standard flow, and the flow of processing the message ends.

In step 211, the ISR and/or ASR requests for acquiring the mapping table entry corresponding to the destination AID of the message from the ILR.

In the step, the ISR and/or ASR does not have the mapping table entry corresponding to the AID1 in local, thus the ISR and/or ASR requests for querying the mapping table entry corresponding to the AID1 from the ILR. If the ILR replies that the table entry of the AID1 does not exist, it is to proceed to step 212; and if the ILR replies with the mapping table entry corresponding to the AID1, the mapping table entry is saved, and it is to turn to step 208.

In step 212, when the ILR replies that the mapping table entry corresponding to the destination AID of the message does not exist, the ISR and/or ASR reconstructs a temporary mapping table entry, and sets an aging timer for the temporary mapping table entry.

In the step, the ILR replies that the table entry of the AID1 does not exist, it represents that an abnormity exits or subscriber information of the MN is cancelled by the operator, the ISR/ASR generates a temporary mapping table entry <AID1, NULL> and sets an aging timer for the temporary mapping table entry. Before the aging timer times out, the received message of which the destination AID is the AID1 is selected; and after the aging timer times out, the temporary mapping table entry is deleted.

Moreover, when the MN is offline and gets online again, it reaccesses any ASR, the ASR registers a new mapping table entry <AID, RID> to the ILR, and establishes a mapping relationship between an RID of the ASR and an AID of the MN; and the ILR sends a mapping table entry update message to the ISR and all the ASRs, and informs the ISR and all the ASRs of a new mapping table entry corresponding to the MN.

The example 2 of the present document will be described in combination with the accompanying drawings below.

Figure 3:
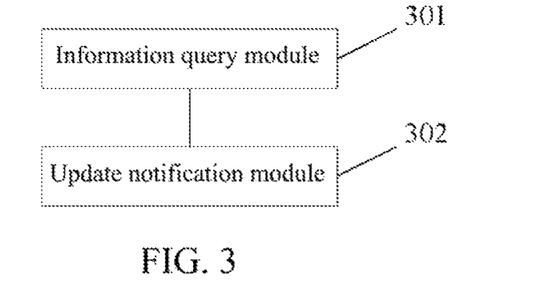
FIG. 3 is a schematic diagram of a structure of an access management device provided by the example 2 of the present document.

The example of the present document provides an access management device, and a structure of the access management device is as shown in FIG. 3, which includes:

an information query module 301, used to: when detecting that an MN accessing an ASR is offline, query a local AID and RID mapping table, and determine a correspondent node of the offline MN; and an update notification module 302, used to: send a mapping table entry update message to an ILR and an ISR and an ASR where the correspondent node is located, and set an RID in a mapping table entry corresponding to the MN to be NULL, which represents that the MN does not access the ASR currently.

Preferably, the update notification module 302 is further used to: when the MN reaccesses any ASR, register a new mapping table entry to the ILR, and establish a mapping relationship between an RID of the ASR and an AID of the MN.

Preferably, the above access management device can be integrated into the ASR, so as to complete corresponding functions.

Figure 4:
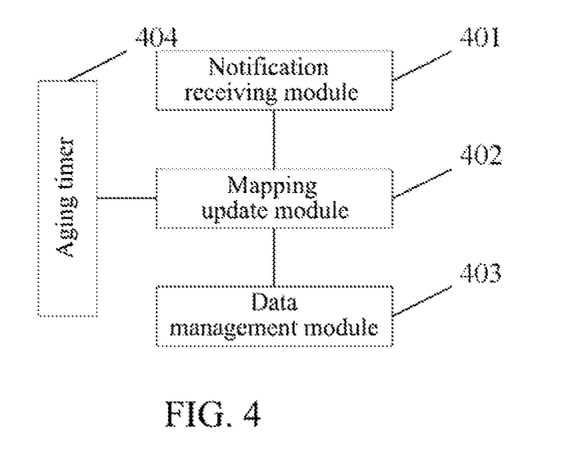
FIG. 4 is a schematic diagram of a structure of another access management device provided by the example 2 of the present document.

The example of the present document also provides an access management device, and a structure of the access management device is as shown in FIG. 4, which includes:

a notification receiving module 401, used to: receive a mapping table entry update message sent by an ASR, wherein, the mapping table entry update message indicates to set an RID in a mapping table entry corresponding to an MN to be NULL, which represents that the MN does not access the ASR currently;

a mapping update module 402, used to: update the locally stored RID in the mapping table entry corresponding to the MN to be NULL; and a data management module 403, used to: when an RID corresponding to a destination AID of a locally received message is NULL, discard the message.

Preferably, the above access management device also includes:

an aging timer 404, used to: start timing after the mapping update module 402 updates the mapping table entry, and after the timing out, indicate the mapping update module 402 to locally delete the mapping table entry.

Preferably, the data management module 403 is further used to: when a mapping table entry corresponding to the destination AID of the received message is not found, send a message for requesting the mapping table entry corresponding to the destination AID to an ILR; and the mapping update module 402 is further used to: receive the mapping table entry corresponding to the destination AID of the message returned by the ILR.

Preferably, the data management module 403 is further used to: when a mapping table entry corresponding to the destination AID of the received message is not found, send a message for requesting the mapping table entry corresponding to the destination AID to an ILR; and the mapping update module 402 is further used to: when the ILR replies that the mapping table entry corresponding to the destination AID does not exist, generate a temporary mapping table entry of the destination AID, set the RID corresponding to the destination AID to be NULL, and set the aging timer 404 for the temporary mapping table entry.

Preferably, the above access management device can be integrated into the ISR or ASR, so as to complete corresponding functions.

Figure 5:
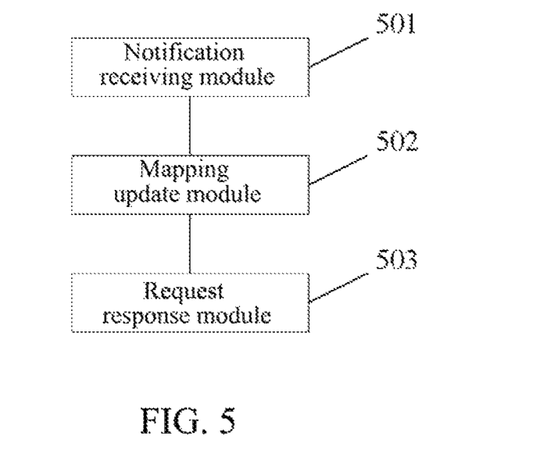
FIG. 5 is a schematic diagram of a structure of another access management device provided by the example 2 of the present document.

The example of the present document also provides an access management device, and a structure of the access management device is as shown in FIG. 5, which includes:

a notification receiving module 501, used to: receive a mapping table entry update message sent by an ASR, wherein, the mapping table entry update message indicates to set an RID in a mapping table entry corresponding to an MN to be NULL, which represents that the MN does not access the ASR currently;

a mapping update module 502, used to: update the locally stored RID in the mapping table entry corresponding to the MN to be NULL; and a request response module 503, used to: when a message for requesting the mapping table entry corresponding to the MN is received, send a response message, and carry the mapping table entry corresponding to the MN in the response message, wherein, the RID recorded in the mapping table entry is NULL.

Preferably, the notification receiving module 501 is further used to: receive a mapping table entry update message sent by an ASR which the MN reaccesses, wherein, a mapping table entry recording a mapping relationship between an AID of the MN and an RID of the reaccessed ASR is included in the mapping table entry update message; and the mapping update module 502 is further used to: update the mapping table entry corresponding to the MN to the mapping table entry in the mapping table entry update message, and inform an ISR and all the ASRs of a new mapping table entry corresponding to the MN.

Preferably, the above access management device can be integrated into the ILR, so as to complete corresponding functions.

The example of the present document also provides an access management system, which includes: a first access management device, a second access management device and a third access management device mentioned above.

the first access management device is used to: when detecting that an MN accessing the first access management device is offline, query a local AID and RID mapping table, determine a correspondent node of the offline MN, send a mapping table entry update message to the second access management device and the third access management device, and set an RID in a mapping table entry corresponding to the MN to be NULL, which represents that the MN does not access an ASR currently; and the second access management device is used to: receive the mapping table entry update message sent by the first access management device, update the locally stored RID in the mapping table entry corresponding to the MN to be NULL, and when an RID corresponding to a destination AID of a locally received message is NULL, discard the message; and the third access management device is used to: receive the mapping table entry update message sent by the first access management device, update the locally stored RID in the mapping table entry corresponding to the MN to be NULL, and when a message for requesting the mapping table entry corresponding to the MN is received, send a response message, and carry the mapping table entry corresponding to the MN in the response message, wherein, the RID recorded in the mapping table entry is NULL.

Preferably, the second access management device is further used to: set an aging timer for the mapping table entry corresponding to the MN, and start timing after updating the mapping table entry, and after the aging timer times out, locally delete the mapping table entry.

Preferably, the second access management device is further used to: when a mapping table entry corresponding to the destination AID of the received message is not found, send a message for requesting the mapping table entry corresponding to the destination AID to the third access management device, and receive the mapping table entry corresponding to the destination AID of the message returned by the third access management device, or, when the third access management device replies that the mapping table entry corresponding to the destination AID does not exist, generate a temporary mapping table entry of the destination AID, set the RID corresponding to the destination AID to be NULL, and set the aging timer for the temporary mapping table entry; and the third access management device is further used to: when a message for requesting the mapping table entry corresponding to the MN is received, send a response message, and carry the mapping table entry corresponding to the MN in the response message, wherein, the RID recorded in the mapping table entry is NULL.

Preferably, the third access management device is further used to: receive a mapping table entry update message sent by an ASR which the MN reaccesses, wherein, a mapping table entry recording a mapping relationship between an AID of the MN and an RID of the reaccessed ASR is included in the mapping table entry update message; update the mapping table entry corresponding to the MN to the mapping table entry in the mapping table entry update message, and inform the second access management device of a new mapping table entry corresponding to the MN.

The access management device and system provided by the example of the present document can be combined with an access management method provided by the example of the present document.

The present document introduces a new method of updating the <AID, RID> mapping table entry in a case that the MN powers off, and this new method has the following advantages.

A. When an information source sends a large amount of data messages to the MN which is power-off, it can effectively avoid that the ASR or ISR to which the information source is connected sends a large number of query messages to the ILR in a short time.

B. In the above case, the data messages sent to the power-off MN are discarded by the ASR or ISR to which the information source is connected, which avoids the waste of network bandwidths.

C. After the MN which is power-off is power on again, the ILR, ISR and ASR can swiftly obtain the new <AID, RID> mapping table entry, and the MN can rapidly recover the normal communication.

A new mechanism of updating the <AID, RID> mapping table entry is provided, and the <AID, RID> mapping table on the ISR and the correspondent node ASR of the MN can be updated more reasonably when the MN powers off, which avoids that the ISR and ASR sends a large number of query messages to the ILR in a short time.

The ordinary person skilled in the art can understand that all or part of steps of the above examples can be implemented by using a flow of computer programs, the computer programs can be stored in a computer readable memory medium, the computer programs are executed on corresponding hardware platforms (such as a system, equipment, device and component and so on), and when the programs are carried out, one of the steps or a combination of the steps of the method examples are included.

Alternatively, all or part of the steps of the above examples also can be implemented by using integrated circuits, these steps can be made into multiple integrated circuit modules respectively, or multiple modules or steps of them can be made into a single integrated circuit module to be implemented. Therefore, the present document is not limited to any combination of hardware and software in a specific form.

The devices or function modules or function units in the above examples can be implemented through a universal calculating device, and they can be concentrated on a single calculating device and also can be distributed in a network consisting of multiple calculating devices.

If implemented in a form of software function module and sold or used as an independent product, the devices or function modules or function units in the above examples can be stored in a computer readable memory medium. The computer readable memory medium mentioned above can be a read-only memory, disk or optical disk and so on.

Any skilled familiar with the art can easily conceive changes and substitutions within the technical scope disclosed by the present document, and these changes and substitutions shall all fall into the protection scope of the present document. Therefore, the protection scope of the present document should be subject to the protection scope described in the claims.

INDUSTRIAL APPLICABILITY

The example of the present document provides an access management method, device and system, wherein, when detecting that an MN accessing an ASR is offline, the ASR queries a local AID and RID mapping table, and determines a correspondent node of the offline MN; and then the ASR sends a mapping table entry update message to an ILR and an ISR and an ASR where the correspondent node is located, and sets an RID in a mapping table entry corresponding to the MN to be NULL, which represents that the MN does not access the ASR currently; the ISR and ASR receive the mapping table entry update message sent by the ASR, wherein, the mapping table entry update message indicates to set the RID in the mapping table entry corresponding to the MN to be NULL, which represents that the MN does not access the ASR currently; the locally stored RID in the mapping table entry corresponding to the MN is updated to be NULL; and when an RID corresponding to a destination AID of a locally received message is NULL, the message is discarded, thus improving the accuracy of the updated mapping table entry, and solving the problem that the update mechanism of the AID and RID mapping relationship table has a low reliability and influences the network working efficiency.

What is claimed is:

1. An access management method, comprising:
a first Access Switching Router (ASR) detecting that a Mobile Node (MN) accessing the first ASR is offline, the first ASR querying a local Access Identity (AID) and Routing Identity (RID) mapping table, and determining a correspondent node of the offline MN; and the first ASR sending a mapping table entry update message carrying a mapping table entry corresponding to the MN in which the RID is set to be NULL to an Information Logging Router (ILR) and an Internet Interface Service Router (ISR) and a second ASR where the correspondent node is located, and the ILR, ISR and the second ASR setting an RID in a mapping table entry corresponding to the MN to be NULL according to the mapping table entry update message from the first ASR, which represents that the MN does not access any ASR currently; and when the ISR or the second ASR determines that an RID in a mapping table entry corresponding to a destination AID of a locally received message is NULL, the ISR or the second ASR discarding the locally received message.

2. The access management method according to claim 1, further comprising:

the MN reaccessing any ASR, the reaccessed ASR registering a new mapping table entry to the ILR, and establishing a mapping relationship between an RID of the reaccessed ASR and an AID of the MN.

3. An access management method, comprising:

receiving from an Access Switching Router (ASR) a mapping table entry update message by an Internet Interface Service Router (ISR) or other ASRs, the mapping table entry update message carrying a mapping table entry corresponding to a Mobile Node (MN) in which a Routing Identity (RID) is set to be NULL, wherein, the mapping table entry update message indicates to set the RID in a mapping table entry corresponding to the MN to be NULL, which represents that the MN does not access any ASR currently;

the ISR or the other ASRs updating the locally stored RID in the mapping table entry corresponding to the MN to be NULL according to the mapping table entry update message received; and when the ISR or the other ASRs determines that an RID in a mapping table entry corresponding to a destination Access Identity (AID) of a locally received message is NULL, the ISR or the other ASRs discarding the locally received message.

4. The access management method according to claim 3, wherein, after a step of updating the locally stored RID corresponding to the AID corresponding to the MN to be NULL, the method further comprises:

setting an aging timer for the mapping table entry corresponding to the MN, and starting timing after updating the mapping table entry; and after the aging timer times out, locally deleting the mapping table entry.

5. The access management method according to claim 3, wherein, the method further comprises:

when a mapping table entry corresponding to the destination AID of the received message is not found, sending a message for requesting the mapping table entry corresponding to the destination AID to an Information Logging Router (ILR); and receiving the mapping table entry corresponding to the destination AID of the message returned by the ILR.

6. The access management method according to claim 3, wherein, the method further comprises:

when a mapping table entry corresponding to the destination AID of the received message is not found, sending a message for requesting the mapping table entry corresponding to the destination AID to an Information Logging Router (ILR); and when the ILR replies that the mapping table entry corresponding to the destination AID does not exist, generating a temporary mapping table entry of the destination AID, setting the RID corresponding to the destination AID to be NULL, and setting an aging timer for the temporary mapping table entry.

7. An access management method, comprising:

an Information Logging Router (ILR) receiving a mapping table entry update message sent by a first Access Switching Router (ASR), the mapping table entry update message carrying a mapping table entry corresponding to a Mobile Node (MN) in which a Routing Identity (RID) is set to be NULL, wherein, the mapping table entry update message indicates to set the RID in a mapping table entry corresponding to the MN to be NULL, which represents that the MN does not access any ASR currently;

the ILR updating the locally stored RID in the mapping table entry corresponding to the MN to be NULL according to the mapping table entry update message received; and when a message for requesting the mapping table entry corresponding to the MN is received from an Internet Interface Service Router (ISR) or a second ASR, the ILR sending a response message to the ISR or the second ASR, and carrying the mapping table entry corresponding to the MN in the response message, wherein, the RID recorded in the mapping table entry is NULL, and when the ISR or the second ASR determines that an RID in a mapping table entry corresponding to a destination Access Identity (AID) of a locally received message is NULL, the ISR armor the second ASR discard the locally received message.

8. The access management method according to claim 7, further comprising:

the ILR receiving a mapping table entry update message sent by an ASR which the MN reaccesses, wherein, a mapping table entry recording a mapping relationship between an AID of the MN and an RID of the reaccessed ASR is included in the mapping table entry update message; and the ILR updating the mapping table entry corresponding to the MN to the mapping table entry in the mapping table entry update message, and informing an ISR and all the ASRs of a new mapping table entry corresponding to the MN.

9. An access management system, comprising: a first access management device, a second access management device and a third access management device;

the first access management device is configured to: when detecting that a Mobile Node (MN) accessing the first access management device is offline, query a local Access Identity (AID) and Routing Identity (RID) mapping table, determine a correspondent node of the offline MN, send a mapping table entry update message carrying a mapping table entry corresponding to the MN in which the RID is set to be NULL to the second access management device and the third access management device, and set an RID in a mapping table entry corresponding to the MN to be NULL, which represents that the MN does not access any Access Switching Router (ASR) currently; and the second access management device is configured to: receive the mapping table entry update message sent by the first access management device, update the locally stored RID in the mapping table entry corresponding to the MN to be NULL according to the mapping table entry update message received, and when an RID in a mapping table entry corresponding to a destination AID of a locally received message is NULL, discard the locally received message; and the third access management device is configured to: receive the mapping table entry update message sent by the first access management device, update the locally stored RID in the mapping table entry corresponding to the MN to be NULL according to the mapping table entry update message received, and when a message for requesting the mapping table entry corresponding to the MN is received, send a response message, and carry the mapping table entry corresponding to the MN in the response message, wherein, the RID recorded in the mapping table entry is NULL.

10. The access management system according to claim 9, wherein, the second access management device is further configured to: set an aging timer for the mapping table entry corresponding to the MN, and start timing after updating the mapping table entry, and after the aging timer times out, locally delete the mapping table entry.

11. The access management system according to claim 10, wherein, the second access management device is further configured to: when a mapping table entry corresponding to the destination AID of the received message is not found, send a message for requesting the mapping table entry corresponding to the destination AID to the third access management device, and receive the mapping table entry corresponding to the destination AID of the message returned by the third access management device, or, when the third access management device replies that the mapping table entry corresponding to the destination AID does not exist, generate a temporary mapping table entry of the destination AID, set the RID corresponding to the destination AID to be NULL, and set the aging timer for the temporary mapping table entry;

the third access management device is further configured to: when a message for requesting the mapping table entry corresponding to the MN is received, send a response message, and carry the mapping table entry corresponding to the MN in the response message, wherein, the RID recorded in the mapping table entry is NULL.

12. The access management system according to claim 9, wherein, the third access management device is further configured to: receive a mapping table entry update message sent by an ASR which the MN reaccesses, wherein, a mapping table entry recording a mapping relationship between an AID of the MN and an RID of the reaccessed ASR is included in the mapping table entry update message; update the mapping table entry corresponding to the MN to the mapping table entry in the mapping table entry update message, and inform the second access management device of a new mapping table entry corresponding to the MN.

* * * * *